(12) United States Patent
Kozakura et al.

(10) Patent No.: US 10,409,992 B2
(45) Date of Patent: Sep. 10, 2019

(54) INVESTIGATION APPARATUS, COMPUTER-READABLE RECORDING MEDIUM, AND INVESTIGATION METHOD

(71) Applicant: FUJITSU LIMITED, Kawasaki-shi, Kanagawa (JP)

(72) Inventors: Fumihiko Kozakura, Hachioji (JP); Kouiohi Itoh, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 15/265,066

(22) Filed: Sep. 14, 2016

(65) Prior Publication Data

US 2017/0109535 A1   Apr. 20, 2017

(30) Foreign Application Priority Data

Oct. 15, 2015  (JP) ................. 2015-204014

(51) Int. Cl.
| G06F 21/00 | (2013.01) |
| G06F 21/57 | (2013.01) |
| G06F 7/02  | (2006.01) |
| H04L 29/06 | (2006.01) |

(52) U.S. Cl.
CPC ............. *G06F 21/577* (2013.01); *G06F 7/02* (2013.01); *H04L 63/302* (2013.01); *G06F 2221/034* (2013.01)

(58) Field of Classification Search
CPC .......... G06F 21/577; G06F 7/02; G06F 21/00; G06F 2221/034; H04L 63/302
See application file for complete search history.

(56) References Cited

U.S. PATENT DOCUMENTS

| 7,661,141 B2* | 2/2010 | Dutta ................. G06F 21/6227 707/693 |
| 9,230,132 B2* | 1/2016 | Gkoulalas-Divanis ..................... G06F 21/6254 |
| 9,602,288 B1* | 3/2017 | Mikulski ............... H04L 9/3247 |
| 9,870,485 B2* | 1/2018 | Li ......................... G06F 21/577 |
| 2001/0000536 A1* | 4/2001 | Tarin ..................... G06F 16/283 |
| 2005/0192998 A1* | 9/2005 | Dittrich ............. G06F 17/30312 |

(Continued)

FOREIGN PATENT DOCUMENTS

| JP | 10-027183 | 1/1998 |
| JP | 2005-004560 | 1/2005 |

(Continued)

*Primary Examiner* — Ghodrat Jamshidi
(74) *Attorney, Agent, or Firm* — Fujitsu Patent Center

(57) ABSTRACT

An investigation apparatus according to an embodiment includes a processor that executes a process including: analyzing uniqueness of a plurality of values included in an attribute for each attribute of a table; reducing a plurality of values included in an attribute of which the analyzed uniqueness is lower than a predetermined value by a predetermined ratio with respect to an investigation original table and outputting a feature of the investigation original table; reducing a plurality of values included in an attribute of which the analyzed uniqueness is higher than a predetermined value by a predetermined ratio with respect to an investigation target table and outputting a feature of the investigation target table; and investigating similarity of the investigation target table to the investigation original table by comparing the feature of the investigation original table with the feature of the investigation target table.

10 Claims, 19 Drawing Sheets

(56) References Cited

U.S. PATENT DOCUMENTS

| | | | |
|---|---|---|---|
| 2007/0219735 A1* | 9/2007 | Saeki | G06F 17/5022 |
| | | | 702/80 |
| 2007/0274489 A1* | 11/2007 | Yamamura | H04M 3/42008 |
| | | | 379/201.1 |
| 2008/0133935 A1* | 6/2008 | Elovici | G06F 21/6227 |
| | | | 713/193 |
| 2008/0155697 A1* | 6/2008 | Zuk | H04L 63/1425 |
| | | | 726/25 |
| 2011/0055166 A1* | 3/2011 | Stephenson | G06F 17/30595 |
| | | | 707/687 |
| 2011/0083190 A1* | 4/2011 | Brown | G06F 21/6209 |
| | | | 726/26 |
| 2011/0258702 A1* | 10/2011 | Olney | G06F 21/564 |
| | | | 726/24 |
| 2013/0262403 A1* | 10/2013 | Milousheff | G06F 16/2365 |
| | | | 707/691 |
| 2014/0130175 A1* | 5/2014 | Ramakrishnan | G06F 21/52 |
| | | | 726/26 |
| 2015/0242633 A1* | 8/2015 | Galil | G06F 21/552 |
| | | | 726/1 |

FOREIGN PATENT DOCUMENTS

| | | |
|---|---|---|
| JP | 2010-182238 | 8/2010 |
| JP | 2011-059504 | 3/2011 |
| JP | 2014-095960 | 5/2014 |

\* cited by examiner

| | ID | NAME | AGE | HOBBY |
|---|---|---|---|---|
| D1 | 38432 | ICHIRO | 40 | BASEBALL |
| | 43294 | JIRO | 35 | SOCCER |
| | 58941 | SABURO | 30 | BASKETBALL |
| | 29304 | SHIRO | 25 | TENNIS |
| | ... | ... | ... | ... |
| UNIQUENESS OF ATTRIBUTE··· | HIGH (H) | HIGH (H) | LOW (L) | LOW (L) |
| FEATURE RESIDUAL RATIO OF ATTRIBUTE··· | ALL | ALL | 1/1000 | 1/1000 |

FIG.8

| FEATURE | DOCUMENT ID | RECORD NUMBER | FEATURE NUMBER | |
|---|---|---|---|---|
| 38432 | 0001 | 1 | 1 | "ATTRIBUTE 1 IS ALL" |
| 43294 | 0001 | 2 | 1 | |
| ... | 0001 | | | |
| ICHIRO | 0001 | 1 | 2 | "ATTRIBUTE 2 IS ALL" |
| JIRO | 0001 | 2 | 2 | |
| ... | 0001 | | | |
| 40 | 0001 | 1 | 3 | "ATTRIBUTE 3 IS 1/1000" |
| ... | | | | |

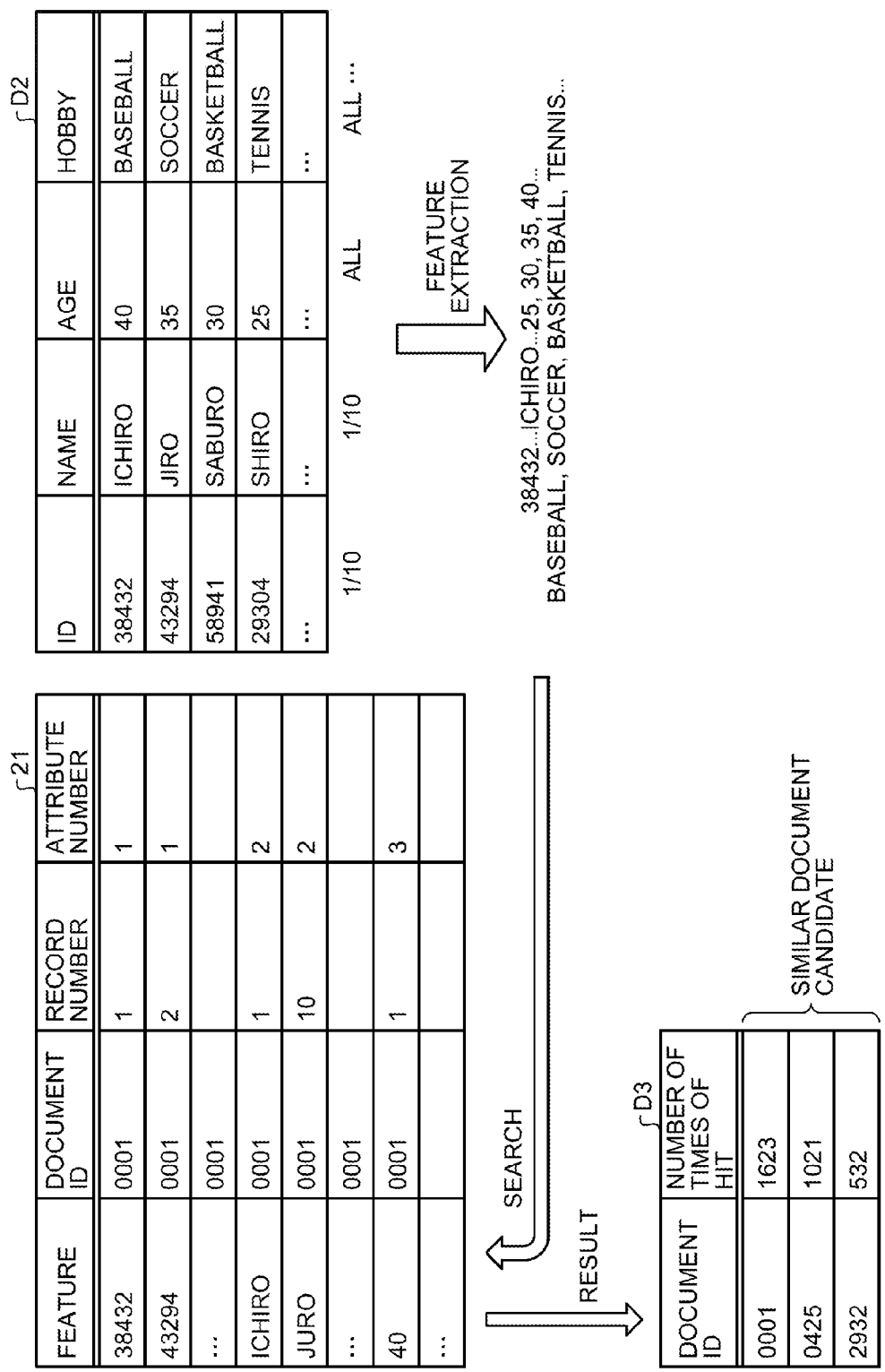

FIG.14

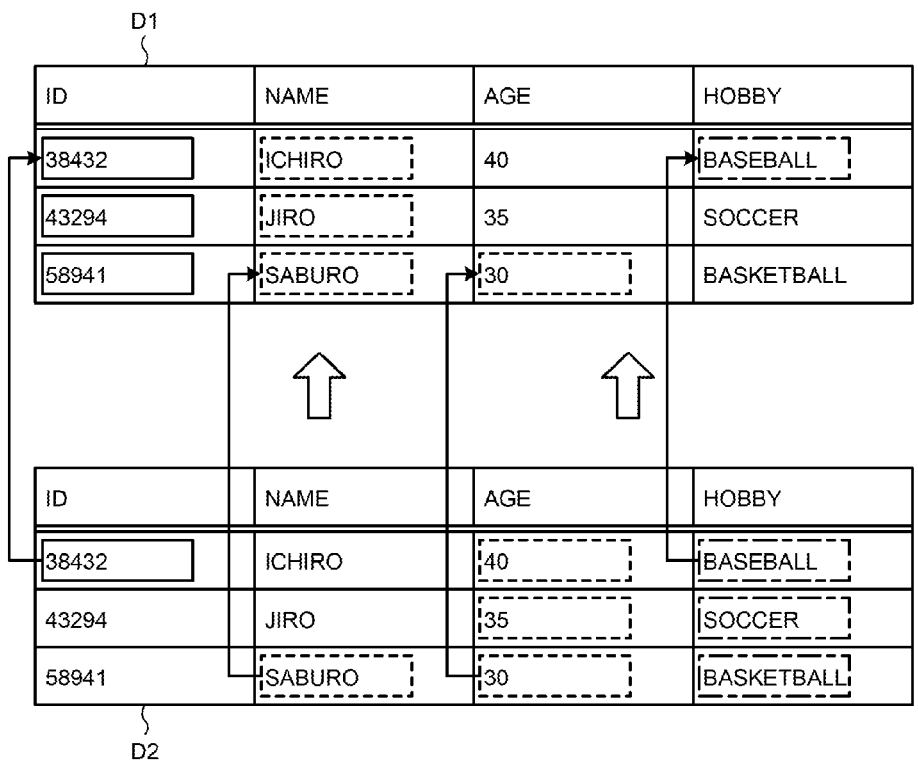

FIG.15

|  | H AND L OF SEARCH INPUT ARE ENTIRELY USED | L OF SEARCH INPUT IS ENTIRELY USED, H IS THINNED OUT BY 1/C | L AND H OF SEARCH INPUT ARE THINNED OUT BY 1/C |
|---|---|---|---|
| SEARCH TIME | nK | nK/C | nK/C |
| SEARCH RATE (FOR EACH ROW) | H COLUMN: 1<br>L COLUMN: $1-(1-p)$ | H COLUMN: $1/C$<br>L COLUMN: $1-(1-p)$ | H COLUMN: $1/C$<br>L COLUMN: $1-(1-p/C)$ |
| SEARCH RATE (ALL OF n ROWS) | H COLUMN: 1<br>L COLUMN: $1-(1-p)^n$ | H COLUMN: $1-(1-1/C)^n$<br>L COLUMN: $1-(1-p)^n$ | H COLUMN: $1-(1-1/C)^n$<br>L COLUMN: $1-(1-p/C)^n$ |

FIG.16

|  | H AND L OF SEARCH INPUT ARE ENTIRELY USED | L OF SEARCH INPUT IS ENTIRELY USED, H IS THINNED OUT BY 1/2 | L AND H OF SEARCH INPUT ARE THINNED OUT BY 1/2 |
|---|---|---|---|
| SEARCH TIME | nK | nK/2 | nK/2 |
| SEARCH RATE (FOR EACH ROW) | H COLUMN: 1<br>L COLUMN: 1/1000 | H COLUMN: 1/2<br>L COLUMN: 1/1000 | H COLUMN: 1/2<br>L COLUMN: 1/2000 |
| SEARCH RATE (ALL OF n ROWS) | H COLUMN: 1<br>L COLUMN:<br>$1-(999/1000)^n$ | H COLUMN: $1-(1/2)^n$<br>L COLUMN:<br>$1-(999/1000)^n$ | H COLUMN: $1-(1/2)^n$<br>L COLUMN:<br>$1-(1999/2000)^n$ |

⇓ n=10

GooD!

|  | H AND L OF SEARCH INPUT ARE ENTIRELY USED | L OF SEARCH INPUT IS ENTIRELY USED, H IS THINNED OUT BY 1/2 | L AND H OF SEARCH INPUT ARE THINNED OUT BY 1/2 |
|---|---|---|---|
| SEARCH TIME | nK | nK/2 | nK/2 |
| SEARCH RATE (FOR EACH ROW) | H COLUMN: 1<br>L COLUMN: 1/1000 | H COLUMN: 1/2<br>L COLUMN: 1/1000 | H COLUMN: 1/2<br>L COLUMN: 1/2000 |
| SEARCH RATE (ALL OF n ROWS) | H COLUMN: 1<br>L COLUMN: 0.01 | H COLUMN: 0.999<br>L COLUMN: 0.01 | H COLUMN: 0.999<br>L COLUMN: 0.005 |

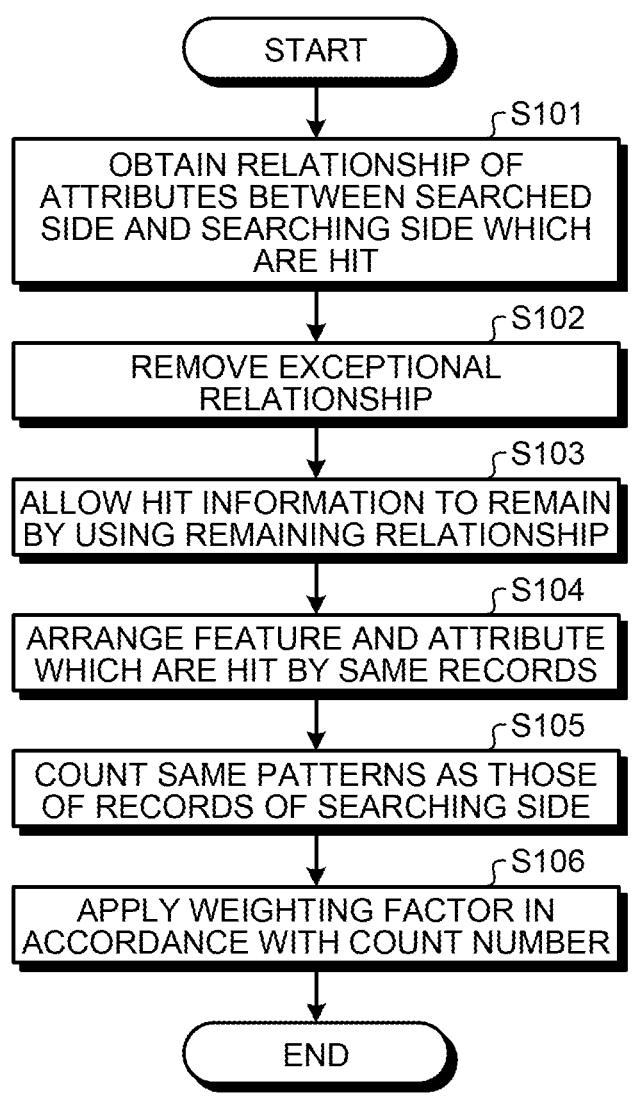

| ATTRIBUTE NUMBER | NUMBER OF TIMES OF HIT | NUMBER OF SEARCH FEATURES | SEARCH FEATURE REMOVAL RATIO | STORED FEATURE REMOVAL RATIO | HIT SEARCH ORIGINAL ATTRIBUTE |
|---|---|---|---|---|---|
| 1 | 10 | 1000 | 1/10 | 1/1 | 10, 0, 0, 0 |
| 2 | 104 | 1000 | 1/10 | 1/1 | 1, 104, 0, 0 |
| 3 | 520 | 50 | 1/1 | 1/1000 | 1, 0, 520, 0 |
| 4 | 1021 | 100 | 1/1 | 1/1000 | 0, 0, 0, 1021 |

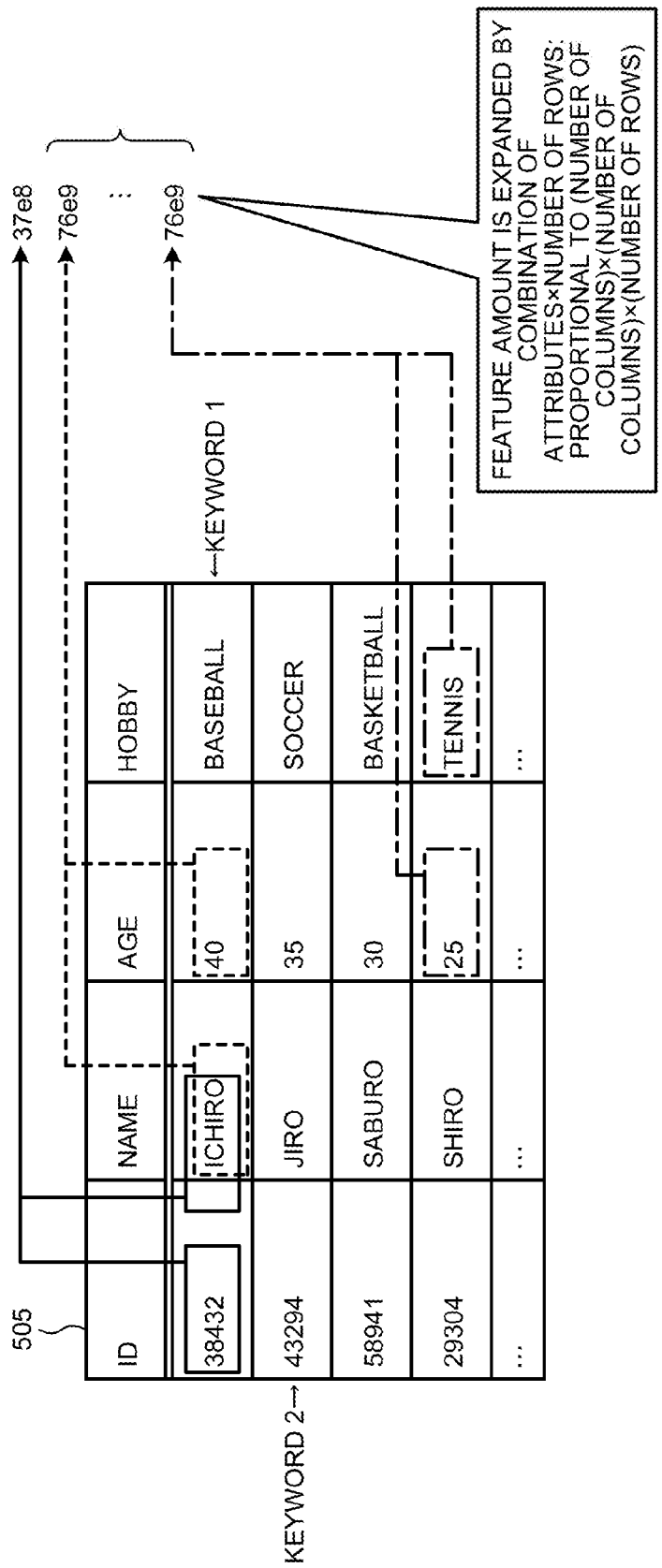

INVESTIGATION APPARATUS, COMPUTER-READABLE RECORDING MEDIUM, AND INVESTIGATION METHOD

CROSS-REFERENCE TO RELATED APPLICATION(S)

This application is based upon and claims the benefit of priority of the prior Japanese Patent Application No. 2015-204014, filed on Oct. 15, 2015, the entire contents of which are incorporated herein by reference.

FIELD

The embodiment discussed herein is related to an investigation apparatus, an investigation program, and an investigation method.

BACKGROUND

In the related art, in companies or the like, as one of measures to information leakage, posterior investigation for specifying an information leaked original is performed. In posterior investigation for the information leakage, together with a manipulation log at the time of file manipulation such as document browsing or document preserving, features (fingerprints (hereinafter, referred to as feature data)) of the manipulated document are recorded. Therefore, in the investigation of the information leakage, the information leaked original is specified by specifying the manipulation log of a document similar to the leaked information by referring to the recorded feature data.

Patent Document 1: Japanese Laid-open Patent Publication No. 2005-4560

However, in the related art described above, in the investigation of table data describing information of various attributes (columns) for each record (row), feature data become huge in comparison with typical documents such as texts, so that there is a problem in that the investigation time is long. For example, in the case of performing posterior investigation for leakage of table data, feature data of the table data recorded at the time of manipulation become huge, so that a certain time is needed for the investigation.

FIG. 20 is an explanation diagram illustrating investigation of information leakage. As illustrated in FIG. 20, with respect to company confidential information 501, a manipulation log of a document 502 on which a user 511 performs manipulation such as referring or updating or feature data of the document 502 are recorded in an intra-company browsing file log 521. For example, together with a file name such as "kimitsu.doc" of the document 502 on which the user 511 performs manipulation, data representing features (lists of keywords) of "for the middle-term business plane . . . " in the document 502 are extracted and recorded in the intra-company browsing file log 521.

Herein, printing of the document 502 is assumed to be leakage to the outside of the company as a document 503 after editing and processing. In addition, the document 503 is assumed to have a file name of "maruhi.pdf" or the like, and thus, the file name is changed to a file name different from that of the document 502. In addition, the contents of the document 503 are changed so that a portion of the contents is different from those of the document 502, for example, like "for the middle-term plan of the business department . . . ". Therefore, in the posterior investigation of the information leakage, the document 502 as the leaked original is specified by searching for features similar to the feature extracted from the document 503 among the features recorded in the intra-company browsing file log 521.

With respect to the feature data representing the features of the document, the feature data is difficult to treat in a keyword state, and thus, data obtained by hashing the keywords are used. For example, the keywords are hashed, and a range-reduced hash value is obtained by performing modulo operation (mod) with a constant n (in addition, the hash value is set as a value obtained by performing mod operation with a constant n, and a hash value before performing the mod operation is set as an intermediate hash value). In this manner, since the keywords included in the document are represented by hash values, feature data where the features of the document are represented by an n×n effective graph are obtained.

In addition, in the case where the value of n is set as about 10000 and, after that, the keywords are hashed, in some cases, the same hash values may be obtained between different keywords. However, in the n×n effective graph, the features are represented by a combination of the keywords. Therefore, between the documents of which contents are different, a possibility that the contents are changed into the same hash value is low, and the effective graph has a property that the contents are difficult to become the same.

In the posterior investigation of the information leakage, a similar document (document 502 as the leaked original) is obtained by comparing the feature data recorded in the intra-company browsing file log 521 with the feature data extracted from the document 503.

FIG. 21 is an explanation diagram illustrating comparison of the feature data. As illustrated in FIG. 21, in the posterior investigation of the information leakage, by obtaining a comparison result 504 by comparing feature data 502a recorded in the intra-company browsing file log 521 with feature data 503a extracted from the document 503, a document similar to the document 503 among the documents of which the features are recorded in the intra-company browsing file log 521 is specified as a leaked original.

More specifically, by representing the feature data 502a and 503a by an n×n effective graph, a combination of features of the document can be represented in an n×n space by setting a flag (being set to 1) of a location where a pair exist. Therefore, in the comparison of the feature data 502a and the feature data 503a, the comparison result 504 is obtained by applying "and(&)" to the n×n space. Next, with respect to the obtained comparison result 504, similarity between the documents corresponding to the feature data 502a and 503a is determined based on the number of 1 (true value) in the "and" of the n×n space.

Herein, in the case of adapting the documents 502 and 503 or the like as the table data, the above-described keyword is replaced with one attribute value included in the table data. However, the table data are obtained by extracting from original data stored in database by using SQL statements or the like. Accordingly, replacing of attributes included in the table data and replacing, adding, removing, or the like of records can be simply changed. Therefore, in the case of extracting the features from the table data, in order to correspond to replacing of the attributes and replacing, adding, removing or the like of records, features as a combination of two features for each attribute are comprehensively produced.

FIG. 22 is an explanation diagram illustrating extraction of the feature data from a table data 505. As illustrated in FIG. 22, in the case of extracting the feature data from the table data 505, combinations of "baseball" of keyword 1, "43294" of keyword 2, and the like are comprehensively produced. Therefore, the data amount (feature amount) of the feature data is combinations of attributes such as "ID", "name", "age", or "hobby"×the number of rows (number of records), which becomes huge. Therefore, in the case of performing the posterior investigation of table data leakage, a time (investigation time) taken for the process according to the extraction of the feature data or the determination of the similarity is increased in comparison with a typical document.

SUMMARY

According to an aspect of an embodiment, an investigation apparatus includes a processor that executes a process including: analyzing uniqueness of a plurality of values included in an attribute for each attribute of a table; reducing a plurality of values included in an attribute of which the analyzed uniqueness is lower than a predetermined value by a predetermined ratio with respect to an investigation original table and outputting a feature of the investigation original table; reducing a plurality of values included in an attribute of which the analyzed uniqueness is higher than a predetermined value by a predetermined ratio with respect to an investigation target table and outputting a feature of the investigation target table; and investigating similarity of the investigation target table to the investigation original table by comparing the feature of the investigation original table with the feature of the investigation target table.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is an explanation diagram illustrating an example of the feature data;

FIG. 13 is an explanation diagram illustrating searching;

FIG. 14 is an explanation diagram illustrating correspondence between table data at the time of searching;

FIG. 15 is an explanation diagram illustrating a search time and a search rate;

FIG. 16 is an explanation diagram illustrating a specific example of the search time and the search rate;

FIG. 17 is a flowchart illustrating details of a process of S66;

FIG. 22 is an explanation diagram illustrating extraction of feature data from table data.

DESCRIPTION OF EMBODIMENTS

Figure 1:
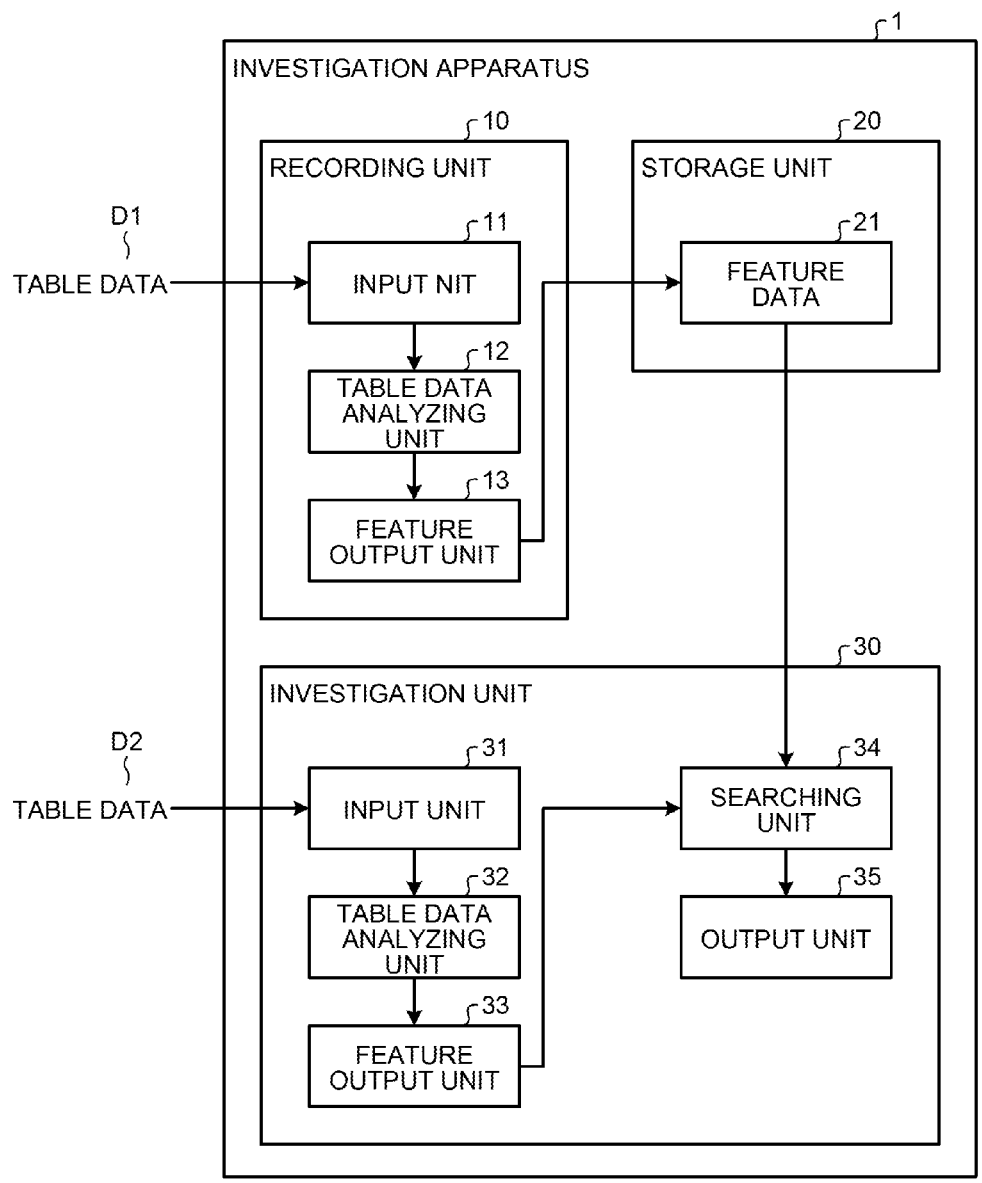
FIG. 1 is a block diagram illustrating a functional configuration of an investigation apparatus according to an embodiment.

Preferred embodiments of the present invention will be explained with reference to accompanying drawings. In the embodiments, components having the same functions are denoted by the same reference numerals, and redundant description thereof is omitted. In addition, the investigation apparatus, the investigation program, and the investigation method described in the embodiments hereinafter are exemplary ones, but these do not limit the embodiments. In addition, the embodiments hereinafter may be appropriately combined to the extent that there is no inconsistency.

FIG. 1 is a block diagram illustrating a functional configuration of an investigation apparatus 1 according to an embodiment. The investigation apparatus 1 illustrated in FIG. 1 is, for example, an information processing apparatus such as a PC (personal computer). The investigation apparatus 1 receives table data D1 according to an investigation original table and table data D2 according to an investigation target table and investigates similarity of the investigation target table to the investigation original table.

Herein, the table data D1 and the table data D2 are data of tables describing information of various attributes (columns) for each record (row). The table data D1 and the table data D2 can be obtained, for example, by extracting SQL statements or the like from original data stored in database. Therefore, by investigating the similarity between the table data D1 and the table data D2, it can be determined whether or not the table data D1 and the table data D2 are obtained from the same original data.

As an example, the investigation apparatus 1 is used for posterior investigation for specifying a table of an information leaked original. More specifically, the investigation apparatus 1 stores feature of the table data D1 of a table which undergoes browsing, preserving, or the like inside the company (investigation original table) as a log and investigates the similarity by comparing the feature of the table data D1 with the feature of the table data D2 of a table leaked to the outside of the company (investigation target table). Next, the investigation apparatus 1 specifies the table data D1 of the table having a high similarity, that is, the table of which a degree of similarity to the table leaked to the outside of the company is a predetermined value or more as an information leaked original.

As illustrated in FIG. 1, the investigation apparatus 1 is configured to include a recording unit 10, a storage unit 20, and an investigation unit 30.

The recording unit 10 receives an input of the table data D1 according to the investigation original table and records feature data 21 representing features of the investigation original table extracted from the table data D1 in the storage unit 20.

The feature data 21 are data obtained by hashing data (numerical values, texts, or the like) of various attributes (columns) for each record (row) included in the table data D1. As the hashing of the data performed by the recording unit 10, well-known methods are used.

For example, an intermediate hash value is obtained from original data such as numerical values, texts, or the like included in the table data D1 by performing a keyed cryptographic hash process using a fixed key. By the keyed cryptographic hash process, the original data is prevented from being estimated. Next, a range-reduced hash value is obtained by performing modulo operation (mod) with a constant n on the intermediate hash value. Therefore, the number of patterns of the hash value in the feature data 21 is allowed to be small, so that a data amount of the feature data 21 is reduced.

The storage unit 20 stores the feature data 21 for each table together with identification information (for example, document ID (Identification Data) or the like) for identifying each table. Therefore, the feature data 21 obtained from the table data D1 of, for example, the table which undergoes browsing, preserving, or the like inside the company, that is, the investigation original table is managed as a log in the storage unit 20.

The investigation unit 30 receives an input of the table data D2 according to the investigation target table and compares the feature of the table extracted from the table data D2 with the feature data 21 of the investigation original table stored in the storage unit 20. By the comparison, the investigation unit 30 investigates the similarity of the investigation target table to the investigation original table. More specifically, the investigation unit 30 compares the hash values included in the respective features to calculate the number (number of times of hit) of times of coincidence between the hash values, so that a degree of similar relationship representing the similarity between the tables is obtained.

In addition, the investigation unit 30 performs comparison with the feature data 21 for each table managed as a log in the storage unit 20, searches for the table having a high degree of similar relationship among the tables managed in the storage unit 20, and outputs the search result. Therefore, a user can specify the table of the leaked original having a high similarity to the table leaked to the outside of the company among the tables managed as a log in the storage unit 20 based on the search result of the investigation unit 30 using the table data D2 of the table leaked to the outside of the company.

Herein, details of the recording unit 10 and the investigation unit 30 are described. The recording unit 10 is configured to include an input unit 11, a table data analyzing unit 12, and a feature output unit 13.

The input unit 11 receives an input of the table data D1 and outputs the input table data D1 to the table data analyzing unit 12. The table data analyzing unit 12 performs analysis on the input table data D1 and notifies the analysis result to the feature output unit 13. More specifically, the table data analyzing unit 12 analyzes uniqueness of a plurality of values included in an attribute for each attribute of the table with respect to the input table data D1.

Herein, the phrase "uniqueness of a plurality of values included in an attribute for each attribute" denotes the number of unique values in the attribute. For example, the uniqueness of the attribute is a ratio of the number of unique values to a total number of values included in the attribute. The larger the number of unique values is, the higher the uniqueness is (H). On the contrary, the smaller the number of unique values is, the lower the uniqueness of the attribute is (L).

For example, with respect to the attribute such as "ID" in the table where all the values are unique values, the ratio of the number of unique values to the total number of values included in the attribute is "1", and thus, the uniqueness is highest. In addition, with respect to the attribute such as "name" where the number of unique values is large, the ratio of the number of unique values to the total number of values included in the attribute becomes a value close to 1, and thus, the uniqueness is heightened. On the contrary, with respect to the attribute such as "age" or "hobby" where the number of unique values is small, the ratio of the number of unique values to the total number of values included in the attribute becomes a value close to 0, and thus, the uniqueness is lowered.

The feature output unit 13 hashes values of various attributes for each record included in the table data D1 and outputs the feature data 21. The output feature data 21 are stored in the storage unit 20. At this time, the feature output unit 13 reduces (thins out) the number of values by reducing the values for each record in the attribute of which the uniqueness is lower than a preset predetermined value by a predetermined ratio based on the analysis result of the table data analyzing unit 12. Next, the feature output unit 13 obtains the feature data 21 by hashing each after-thinning-out value with respect to the attribute of which the uniqueness is low. In addition, with respect to the attribute on which the thinning-out is not performed, each value included in the attribute is hashed as it is.

Figures 2, 3:
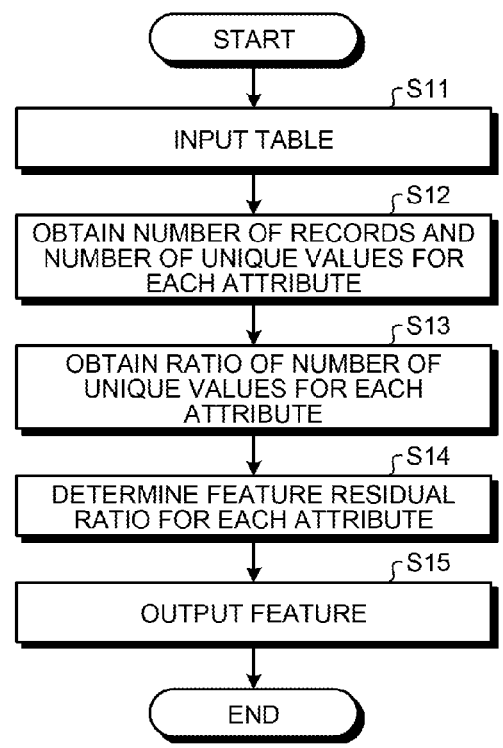
FIG. 2 is a flowchart illustrating a process of recording feature data.
FIG. 3 is an explanation diagram illustrating an example of table data.

FIG. 2 is a flowchart illustrating a process of recording the feature data. As illustrated in FIG. 2, if the process is started, the input unit 11 receives an input of the table data D1 (S11).

FIG. 3 is a diagram illustrating an example of the table data D1. As illustrated in FIG. 3, the table data D1 include the attributes (columns) such as "ID", "name", "age", and "hobby" for each record (row). Herein, with respect to the attributes "ID" and "name", the uniqueness is assumed to be higher than a preset predetermined value. In addition, with respect to the attributes "age" and "hobby", the uniqueness is assumed to be lower than a preset predetermined value.

Next, the table data analyzing unit 12 obtains the number of records included in the table and the number of unique values for each attribute by referring to the records (rows) included in the input table data D1 and the values of the attributes (columns) (S12).

Figure 4:
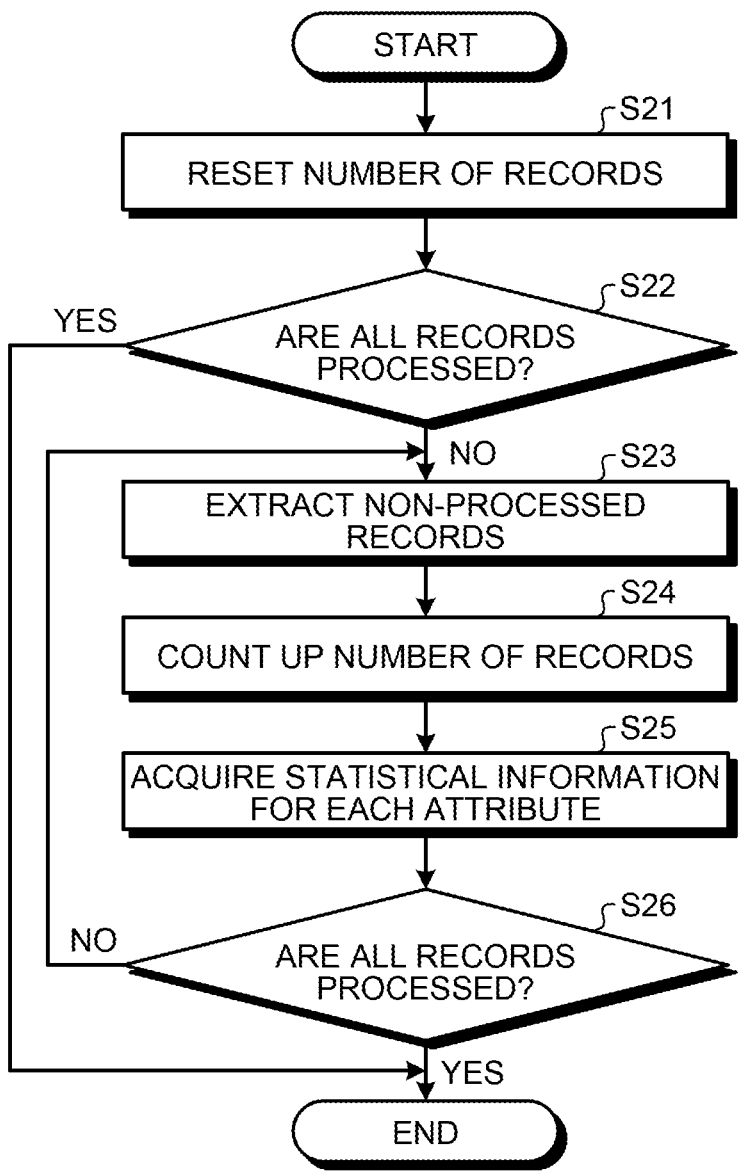
FIG. 4 is a flowchart illustrating details of a process of S12.

FIG. 4 is a flowchart illustrating details of the process of S12. As illustrated in FIG. 4, initially, the table data analyzing unit 12 resets the number of records (for example, number of records=0) (S21). Next, the table data analyzing unit 12 determines whether or not all the records included in the input table data D1 are processed (S22). In the case where the process on all the records is ended (S22: YES), the table data analyzing unit 12 ends the process of S12.

In the case where the process on all the records is not ended (S22: NO), the table data analyzing unit 12 extracts non-processed records from the records included in the input table data D1 (S23). Next, the table data analyzing unit 12 counts up the number of records from the extracted records (S24) and acquires statistical information for obtaining the number of unique values for each attribute (S25). Next, the table data analyzing unit 12 determines whether or not all the records included in the table data D1 are processed (S26). In the case where all the records are not processed (NO), the table data analyzing unit returns to the process of S23, and in the case where all the records are processed (YES), the table data analyzing unit ends the process of S12.

Figure 5:
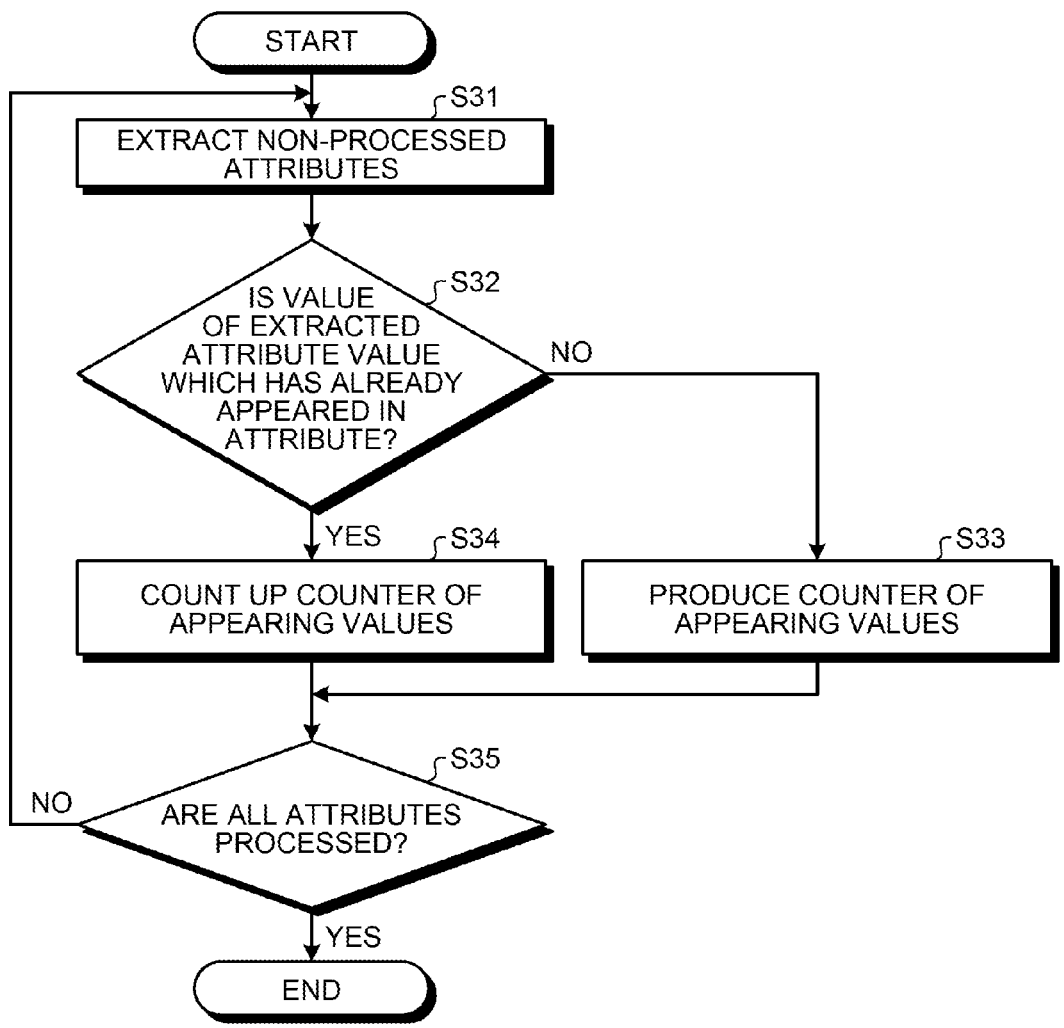
FIG. 5 is a flowchart illustrating details of a process of S25.

FIG. 5 is a flowchart illustrating details of the process of S25. As illustrated in FIG. 5, the table data analyzing unit 12 extracts non-processed attributes from the records extracted in S23 (S31). Next, the table data analyzing unit 12 determines whether or not each value of the extracted attribute is a value (previously-appeared value) which has already appeared in the attribute (S32).

In the case where the value is a previously-appeared value (S32: YES), the table data analyzing unit 12 counts up the counter corresponding to the appearing value (S34). In the case where the value is not a previously-appeared value (S32: NO), the table data analyzing unit 12 produces the counter corresponding to the appearing value (S33). The counter which is counted for each previously-appeared value is statistical information for obtaining the number of unique values for each attribute. For example, the case where the counter is "1" represents that the value is a unique value.

Next, the table data analyzing unit 12 determines whether or not all the attributes are processed (S35). In the case where the process on all the attributes is not performed (S35: NO), the table data analyzing unit returns to the process of S31. In addition, in the case where the process on all the attributes is performed (S35: YES), the table data analyzing unit 12 ends the process of S25.

Returning to FIG. 2, subsequently to S12, the table data analyzing unit 12 obtains a ratio of the unique values for each attribute from the ratio between the number of previously-appeared values and the number of unique values of which the counter for each previously-appeared value is "1" based on the statistical information for each attribute (S13). The ratio of the unique values for each attribute obtained in S13 is a value representing the uniqueness for each attribute.

Next, the table data analyzing unit 12 determines a feature residual ratio for each attribute, that is, a ratio of values remaining as features from a plurality of values included in the attribute based on the ratio of the unique values for each attribute obtained in S13 (S14).

More specifically, the table data analyzing unit 12 determines based on the ratio of the unique values for each attribute obtained in S13 whether or not the uniqueness of the attribute (ratio of the unique values) is lower than a preset predetermined value. With respect to the attribute (H) of which the uniqueness is determined not to be lower, the feature residual ratio is set as "1", in other words, all the values are set to remain as features. In addition, with respect to the attribute (L) of which the uniqueness is determined to be lower, the values obtained by thinning-out the feature residual ratio by a predetermined ratio, that is, a predetermined ratio are set to remain as features.

Figure 6:
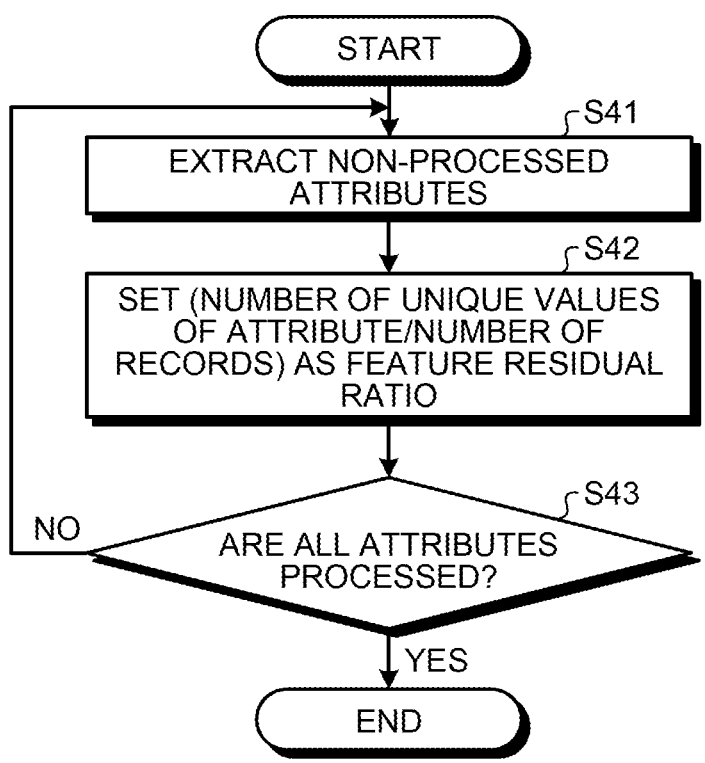
FIG. 6 is a flowchart illustrating details of a process of S14.

FIG. 6 is a flowchart illustrating details of the process of S14. As illustrated in FIG. 6, the table data analyzing unit 12 extracts the non-processed attributes (S41) and obtains the feature residual ratio of the extracted attributes (S42).

More specifically, with respect to the attribute (H) of which the uniqueness is not low, the feature residual ratio is set to "1", in other words, all the values are set to remain as features. In addition, with respect to the attribute (L) of which the uniqueness is low, the number of unique values/the number of records of the attribute is set as the feature residual ratio. In this manner, by setting the feature residual ratio corresponding to the ratio of the number of unique values/the number of records, the feature residual ratio in accordance with the uniqueness can be set.

In addition, the calculation of the feature residual ratio described above is exemplary one. For example, with respect to the attribute classified as L, the feature residual ratio may be set to be a constant ratio. In this manner, the feature residual ratio is set so that, with respect to the attribute classified as H, all the values are allowed to remain as features; and with respect to the attribute classified as L, the thinning-out is performed.

For example, in the example of the table data D1 in FIG. 3, with respect to the attributes such as "ID" and "name" of which the uniqueness is H, the feature residual ratio is set as "all"(feature residual ratio="1"). In addition, with respect to the attributes such as "age" and "hobby" of which the uniqueness is L, the feature residual ratio is set to "1/1000".

Next, the table data analyzing unit 12 determines whether or not all the attributes are processed (S43). In the case where the process on all the attributes is not performed (S43: NO), the table data analyzing unit returns to the process of S41. In addition, in the case where the process on all the attributes is performed (S43: YES), the table data analyzing unit 12 ends the process of S14.

In this manner, in S14, the feature residual ratio is set so that, with respect to the attributes classified as H, all the values are set to remain as features, and with respect to the attributes classified as L, the thinning-out is performed.

Returning to FIG. 2, subsequently to S14, the feature output unit 13 outputs the features obtained by thinning-out the values of each attribute based on the feature residual ratio for each attribute and records the features as the feature data 21 in the storage unit 20 (S15).

Figure 7:
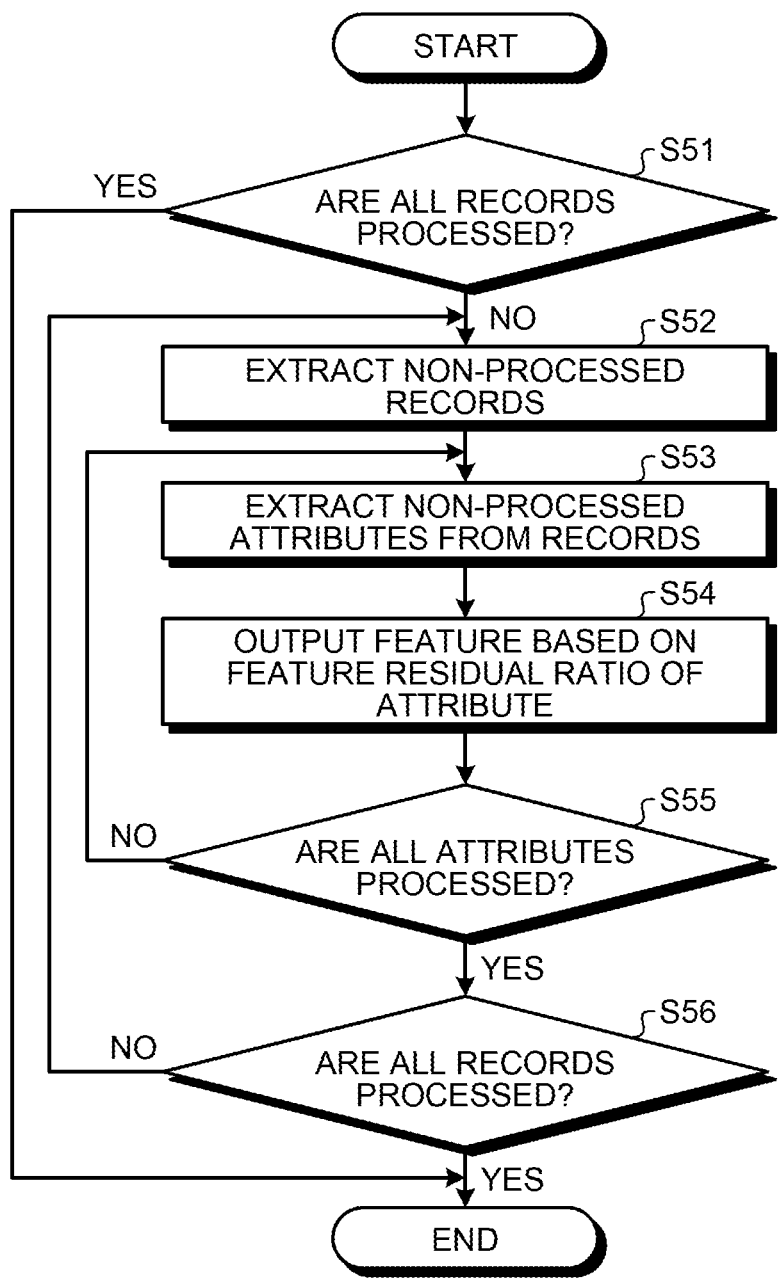
FIG. 7 is a flowchart illustrating details of a process of S15.

FIG. 7 is a flowchart illustrating details of the process of S15. As illustrated in FIG. 7, if the process is started the feature output unit 13 determines whether or not all the records included in the input table data D1 are not processed (S51). In the case where the process on all the records is ended (S51: YES), the feature output unit 13 ends the process of S15.

In the case where the process on all the records is not ended (S51: NO), the feature output unit 13 extracts non-processed records from the records included in the input table data D1 (S52). Next, the feature output unit 13 extracts non-processed attributes from the extracted records (S53).

Next, the feature output unit 13 performs thinning-out values based on the feature residual ratio of the attributes and outputs the features obtained by hashing the after-thinning-out values (S54). More specifically, with respect to the attributes classified as H, of which the feature residual ratio is "1", the features obtained by hashing all the values are output. In addition, with respect to the attributes classified as L, of which the feature residual ratio is a predetermined ratio other than "1", the features obtained by hashing the values after performing the thinning-out by the feature residual ratio are output.

Next, the feature output unit 13 determines whether or not all the attributes are processed (S55). In the case where the process on all the attributes is not performed (S55: NO), the feature output unit returns to the process of S53. In addition, in the case where the process on all the attributes is performed (S55: YES), the feature output unit 13 proceeds to the process S56.

In S56, the feature output unit 13 determines whether or not all the records included in the input table data D1 are processed. In the case where the process on all the records is ended (S56: YES), the feature output unit 13 ends the process of S15. In addition, in the case where the process on all the records is not ended (S56: NO), the feature output unit 13 returns to the process of S52.

FIG. 8 is an explanation diagram illustrating an example of the feature data 21. As illustrated in FIG. 8, the feature data 21 include items of "feature", "document ID", "record number", "attribute number", and the like.

The "feature" is a value of the feature output by the feature output unit 13. In the example illustrated, although before-hashing values are illustrated for the easier understanding, in actual cases, after-hashing hash values are stored. The "document ID" is identification information representing the table (document) of the input table data D1, and a unique numerical value or the like allocated at the time of storing data or the like is stored. The "record number" is a record number of an item according to the "feature", and a record numbers of a record extracted in S52 are stored. The "attribute number" is information representing an attribute of an item according to the "feature", and a number (for example, a position of arrangement of a column) or the like representing an attribute extracted in S53 is stored.

For example, with respect to the attributes classified as H, that is, attribute 1 and attribute 2 in "ID" and "name" of FIG. 3, the values of the entire items are hashed based on the feature residual ratio to be recorded as features. In addition, with respect to the attributes classified as L, that is, attribute 3 . . . in "age" and "hobby" in FIG. 3, the values of the items which are reduced down to 1/1000 are hashed based on the feature residual ratio to be recorded as features. In this manner, by performing value reduction based on the feature residual ratio, it is possible to reduce the data amount of the feature data 21.

Returning to FIG. 1, the investigation unit 30 is configured to include an input unit 31, a table data analyzing unit 32, a feature output unit 33, a searching unit 34, and output unit 35.

The input unit 31 receives an input of the table data D2 and outputs the input table data D2 to the table data analyzing unit 32. The table data analyzing unit 32 performs analysis on the input table data D2 and notifies the analysis result to the feature output unit 33. More specifically, similarly to the table data analyzing unit 12, the table data analyzing unit 32 analyzes uniqueness of a plurality of values included in an attribute for each attribute of the table with respect to the input table data D2.

The feature output unit 33 obtains features of the table according to the table data D2 by hashing the values of various attributes for each record included in the table data D2 and outputs the features to the searching unit 34. At this time, the feature output unit 33 reduces (thins out) the number of values by reducing the values for each record in the attribute of which the uniqueness is higher than a preset predetermined value by a predetermined ratio based on the analysis result of the table data analyzing unit 32. Next, the feature output unit 33 hashes each after-thinning-out value with respect to the attribute (H) of which the uniqueness is high. In addition, with respect to the attribute (L) on which the thinning-out is not performed, each value included in the attribute is hashed as it is.

The searching unit 34 investigates the similarity of the table by comparing the feature of the table according to the table data D2 output from the feature output unit 33 with the feature of each table stored in the feature data 21. More specifically, the searching unit 34 compares the hash values included in the respective features to calculate the number (number of times of hit) of times of coincidence between the hash values, so that a degree of similar relationship representing the similarity between the tables is obtained. Next, the searching unit 34 outputs the table having a high degree of similar relationship among the tables stored in the feature data 21 as a search result (for example, document ID or the like representing a table having a high degree of similar relationship) to the output unit 35. In addition, evaluation of a height of a degree of similar relationship may be arbitrarily determined. For example, a table where the degree of similar relationship is a predetermined value or more may be used, or a table ranging from a side having a high degree of similar relationship down to a predetermined order may be used.

The output unit 35 performs outputting the search result based on the search result of the searching unit 34 by screen display in a display device such as an LCD (Liquid Crystal Display) or printing on a paper medium or the like in a printing device such as a printer.

Figure 9:
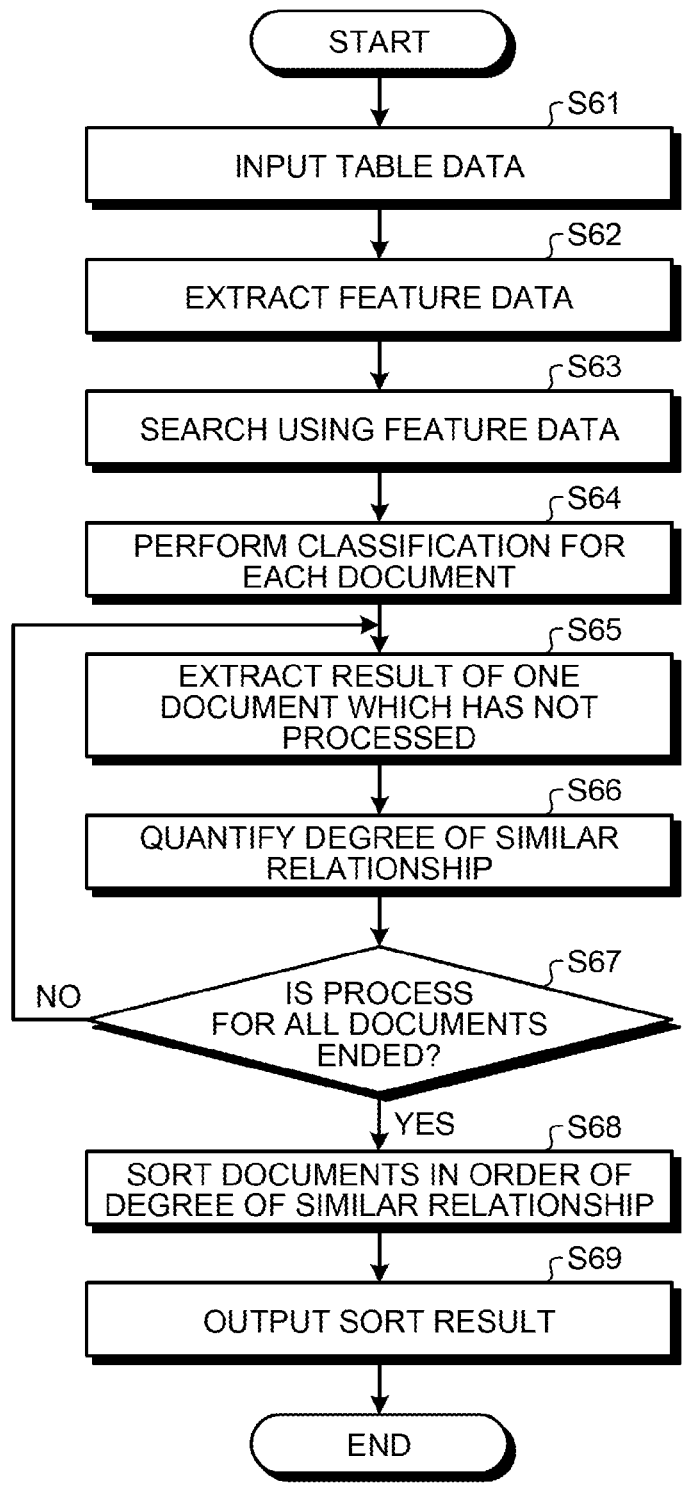
FIG. 9 is a flowchart illustrating an investigation process.

FIG. 9 is a fluorescent image an investigation process. As illustrated in FIG. 9, if the process is started the input unit 31 receives an input of the table data D2 (S61). Next, the feature output unit 33 extracts the feature data from the input table data D2 based on the analysis result of the table data analyzing unit 32 with respect to the table data D2 (S62).

Figure 10:
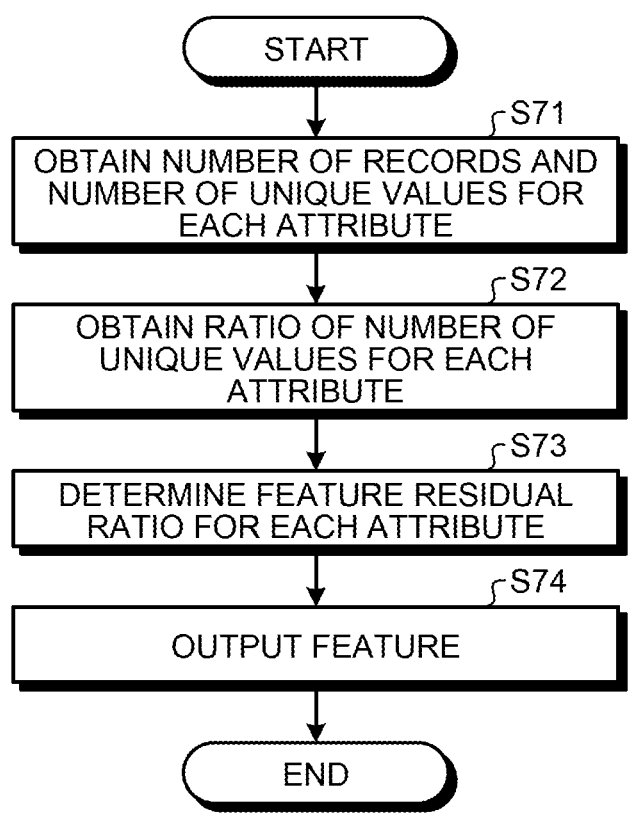
FIG. 10 is a flowchart illustrating details of a process of S62.

FIG. 10 is a flowchart illustrating details of the process of S62. As illustrated FIG. 10, if the process is started, similarly to S12, the table data analyzing unit 32 obtains the number of records included in the table and the number of unique values for each attribute by referring to the input table data D2 (S71).

Next, similarly to S13, the table data analyzing unit 32 obtains a ratio of the unique values for each attribute (S72). The ratio of the unique values for each attribute obtained in S72 is a value representing the uniqueness for each attribute.

Next, the table data analyzing unit 32 determines a feature residual ratio for each attribute, that is, a ratio of values remaining as features from a plurality of values included in the attribute based on the ratio of the unique values for each attribute obtained in S72 (S73).

More specifically, the table data analyzing unit 32 determines based on the ratio of the unique values for each attribute obtained in S72 whether or not the uniqueness of the attribute (ratio of the unique values) is higher than a preset predetermined value. With respect to the attribute (L) of which the uniqueness is determined not to be higher, the feature residual ratio is set to "1", in other words, all the values are set to remain as features. In addition, with respect to the attribute (H) of which the uniqueness is determined to be higher, the values obtained by thinning-out the feature residual ratio by a predetermined ratio, that is, a predetermined ratio are set to remain as features.

Figure 11:
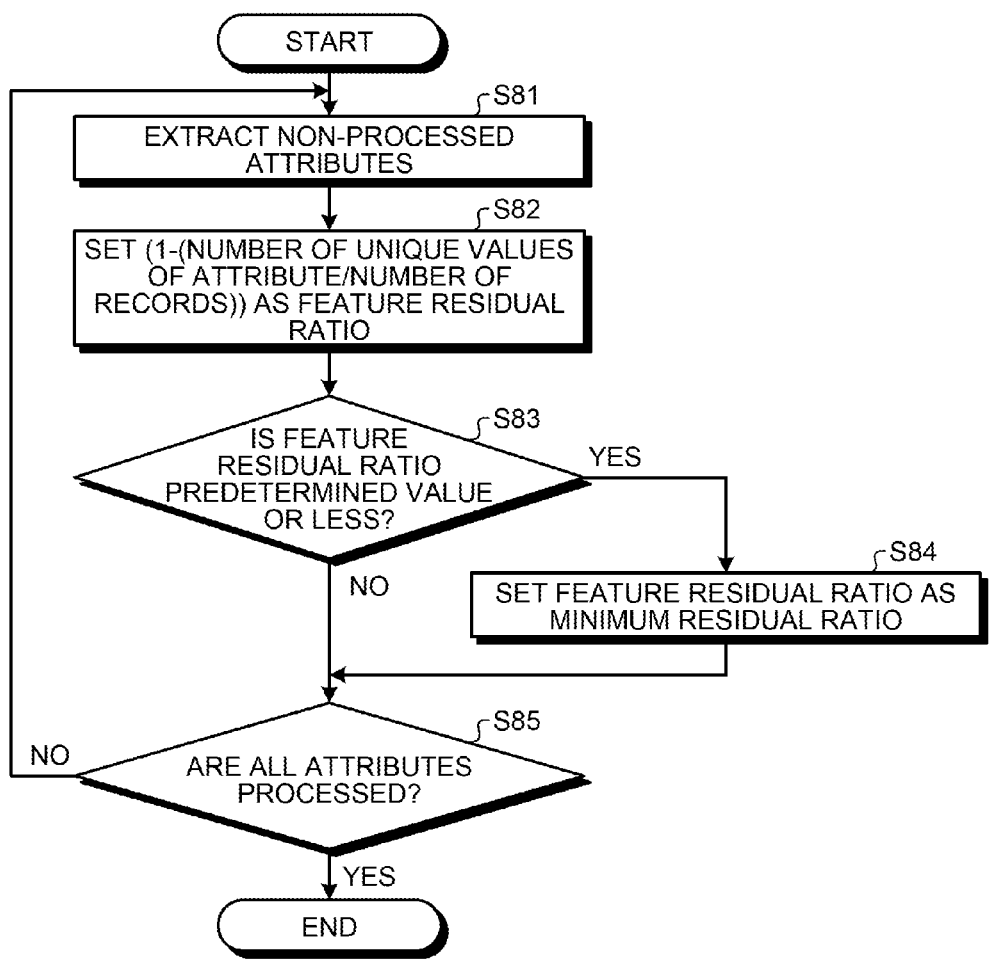
FIG. 11 is a flowchart illustrating details of a process of S73.

FIG. 11 is a flowchart illustrating details of the process of S73. As illustrated in FIG. 11, the table data analyzing unit 32 extracts the non-processed attributes (S81) and obtains the feature residual ratio of the extracted attribute (S82).

More specifically, with respect to the attribute (L) of which the uniqueness is not higher, the feature residual ratio is set as "1", in other words, all the values are set to remain as features. In addition, with respect to the attribute (H) of which the uniqueness is high, (1−(number of unique values/number of records of attribute)) is set as the feature residual ratio. In this manner, by setting the feature residual ratio corresponding to the ratio according to (1−(number of unique values of attribute/number of records)), the feature residual ratio in accordance with the uniqueness can be set.

In addition, the calculation of the feature residual ratio described above is exemplary one. For example, with respect to the attributes classified as H, the feature residual ratio may be set to be a constant ratio. In this manner, the feature residual ratio is set so that, with respect to the attributes classified as L, all the values are allowed to remain as features; and with respect to the attributes classified as H, the thinning-out is performed.

Next, the table data analyzing unit 32 determines whether or not the feature residual ratio is a preset predetermined value or less (S83). In the case where the feature residual ratio is the predetermined value or less (S83: YES), the feature residual ratio is set as a preset minimum residual ratio (S84). In addition, in the case where the feature residual ratio is not the predetermined value or less (S83: NO), the table data analyzing unit 32 skips the process of S84 and proceeds to the process of S85. In this manner, by setting the minimum residual ratio, the feature is prevented from not remaining due to the lowering of the feature residual ratio as the uniqueness is increased, so that it is possible to secure a certain amount or more as the feature amount in the attribute.

Next, the table data analyzing unit 32 determines whether or not all the attributes are processed (S85). In the case where all the attributes are not processed (S85: NO), the table data analyzing unit returns to the process of S81. In addition, In the case where all the attributes are processed (S85: YES), the table data analyzing unit 32 ends the process of S73.

In this manner, in S73, the feature residual ratio is set so that, with respect to the attributes classified as L, all the values are set to remain as features, and with respect to the attributes classified as H, the thinning-out is performed.

Returning to FIG. 10, subsequently to S73, the feature output unit 33 outputs the features of the table data D2 obtained by thinning-out the values of each attribute based on the feature residual ratio for each attribute to the searching unit 34 (S74).

Figure 12:
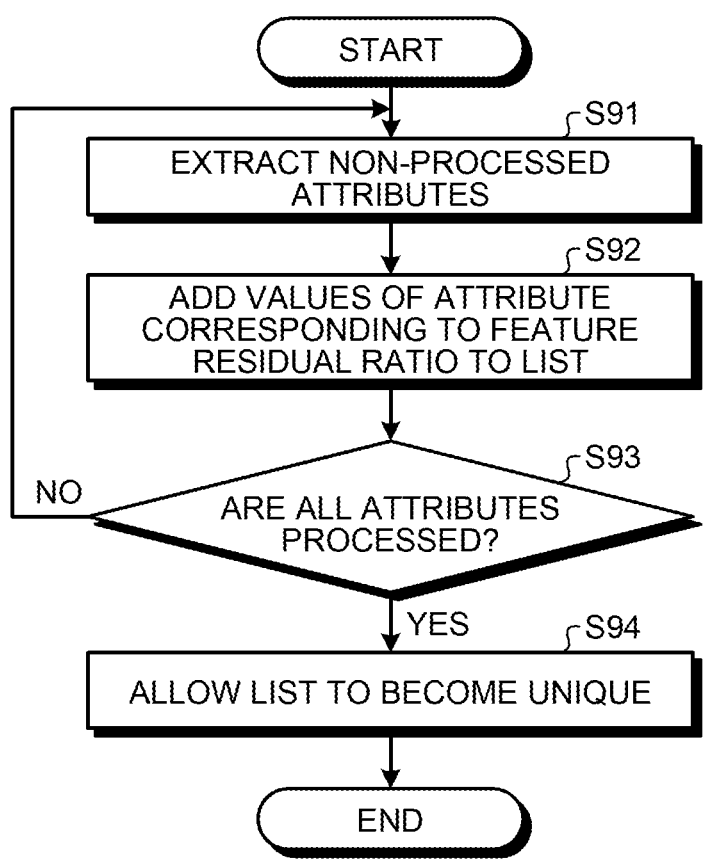
FIG. 12 is a flowchart illustrating details of a process of S74.

FIG. 12 is a flowchart illustrating details of the process of S74. As illustrated in FIG. 12, if the process is started, the feature output unit 33 extracts the non-processed attributes (S91).

Next, the feature output unit 33 performs thinning-out values based on the feature residual ratio of the attributes and adds the values of the attributes corresponding to the feature residual ratio to a list according to the table data D2 (S92). More specifically, with respect to the attributes classified as L, of which the feature residual ratio is "1", all the values are added to the list. In addition, with respect to the attributes classified as H, of which the feature residual ratio is a predetermined ratio other than "1", the values after performing the thinning-out by the feature residual ratio are added.

Next, the feature output unit 33 determines whether or not all the attributes are processed (S93). In the case where all the attributes are not processed (S93: NO), the feature output unit returns to the process of S91. In addition, in the case where the process on all the attributes is processed (S93: YES), the feature output unit 33 proceeds to the process of S94. In S94, the feature output unit 33 allows the list to become unique (hashes each value of the list) and outputs the list to the searching unit 34.

Returning to FIG. 9, the searching unit 34 performs searching for the features of which hash values are coincident with each other by comparing with the feature data 21 stored in the storage unit 20 using the feature data of the table data D2 extracted in S62 (S63). Next, the searching unit 34 obtains the number of times of hit of the features for each document by classifying the features obtained from the searching for each document represented by the document ID (S64).

FIG. 13 is an explanation diagram illustrating searching. FIG. 13 illustrates the case of searching for the feature data 21 by using the features extracted from the table data D2. In the table data D2, with respect to the attribute (L) such as "age" and "hobby", of which the uniqueness is not high, the entire features are set to be extracted. In addition, with respect to the attribute (H) such as "ID" and "name", of which the uniqueness is high, the features on which the thinning-out is performed by 1/10 are set to be extracted. In addition, with respect to each feature, in the example illustrated, although before-hashing values are illustrated for the easier understanding, in actual cases, after-hashing hash values are stored.

As illustrated in FIG. 13, the searching unit 34 performs searching for the features which are coincident with the features of the feature data 21 on the features extracted from the table data D2 and obtains a search result D3 by classifying the features searched from the feature data 21 for each document ID. The search result D3 is summarized as the number of times of hit of the features for each document ID. Based on the search result D3 obtained in this manner, the table (table corresponding to the document ID) of which the number of times of hit is large becomes a candidate for a table similar to the table of the table data D2.

FIG. 14 is an explanation diagram illustrating correspondence between table data D1 and D2 at the time of searching. As illustrated in FIG. 14, all the values of "ID" and "name" of the table data D1 according to the investigation original table are recorded as the features in the feature data 21 because the attributes are the attributes (H) of which the uniqueness is high. On the contrary, the values of "ID" and "name" of the table data D2 according to the investigation target table are thinned out because the attributes are the attributes (H) of which the uniqueness is high. Therefore, at the time of searching, the number of times of comparison is reduced due to the thinning-out, so that the searching can be performed at a high speed. In addition, with respect to the investigation target table, although the values of the attributes of which the uniqueness is high are thinned out, in the case where the investigation target table is similar to the investigation original table, the corresponding features are hit at a high accuracy.

In addition, the values of "age" and "hobby" of the table data D1 according to the investigation original table are recorded as the features in the feature data 21 because the attributes are the attributes (L) of which the uniqueness is low. On the contrary, all the values of "age" and "hobby" of the table data D2 according to the investigation target table are extracted because the attributes are the attributes (L) of which the uniqueness is low. Therefore, at the time of searching, the number of times of comparison is reduced due to the thinning-out, so that the searching can be performed at a high speed. In addition, with respect to the attributes (L) of which the uniqueness is low in the table data D1, almost all the features which do not overlap each other even through the thinning-out is performed more or less times are recorded in the feature data 21. Therefore, with respect to the investigation target table, all the features of the attributes of which the uniqueness is low are extracted, and the features are compared with the feature data 21. In the case where the investigation target table is similar to the investigation original table, the corresponding features are hit at a high accuracy.

FIG. 15 is an explanation diagram illustrating a search time and a search rate. More specifically, FIG. 15 illustrates formulation of the search time and the search rate for each condition at the time of comparing the above-described table data D1 according to the investigation original table and the above-described table data D2 according to the investigation target table. In FIG. 15, H represents the attribute of which the uniqueness is high, and L represents the attribute of which the uniqueness is low. In addition, p represents the feature residual ratio of the attribute of L in the table data D1. In addition, n represents the number of rows of the table in the table data D2. As illustrated in FIG. 15, a condition (1) where H and L of the search input (table data D2) are entirely used, a condition (2) where L of the search input is entirely used, and H is thinned out by 1/C, and a condition (3) where both of L and H of the search input are thinned out by 1/C are formulated.

FIG. 16 is an explanation diagram illustrating a specific example of the search time and the search rate. More specifically, FIG. 16 illustrates insertion of numerical values into the formulas of the conditions (1) to (3) of FIG. 15. In FIG. 16, p=1/1000, n=10, and C=2. As illustrated in FIG. 16, with respect to the search rate representing the ratio where the corresponding features are hit, almost all the conditions are maintained, and in contrast to the condition (1), the condition (2) corresponding to the embodiment provides more appropriate result than the condition (3). In addition, with respect to the search time, in contrast to the condition (1), in the conditions (2) and (3), the search time becomes ½, so that the speed of two times can be expected.

Returning to FIG. 9, subsequently to S64, the searching unit 34 extracts the result (information of hit classified for each document ID) of one document which has not been processed from the search results D3 (S65). Next, the searching unit 34 quantifies the degree of similar relationship according to the extracted document (S66).

FIG. 17 is a flowchart illustrating details of the process of S66. As illustrated in FIG. 17, if the process is started, the searching unit 34 obtains a correspondence relationship of attributes between the searched side (search original) and the searching side (search target) which are hit by referring the information of hit with respect to the extracted document (S101).

Figures 18, 19:
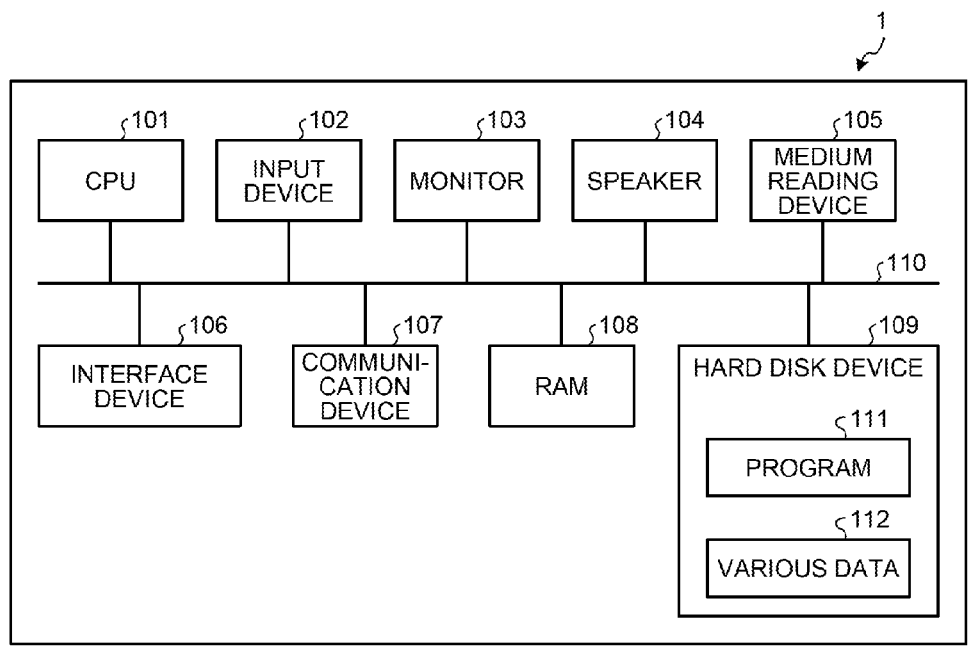
FIG. 18 is an explanation diagram illustrating correspondence relationship between the attributes.
FIG. 19 is a block diagram illustrating an example of a hardware configuration of an investigation apparatus according to an embodiment.
Figure 20:
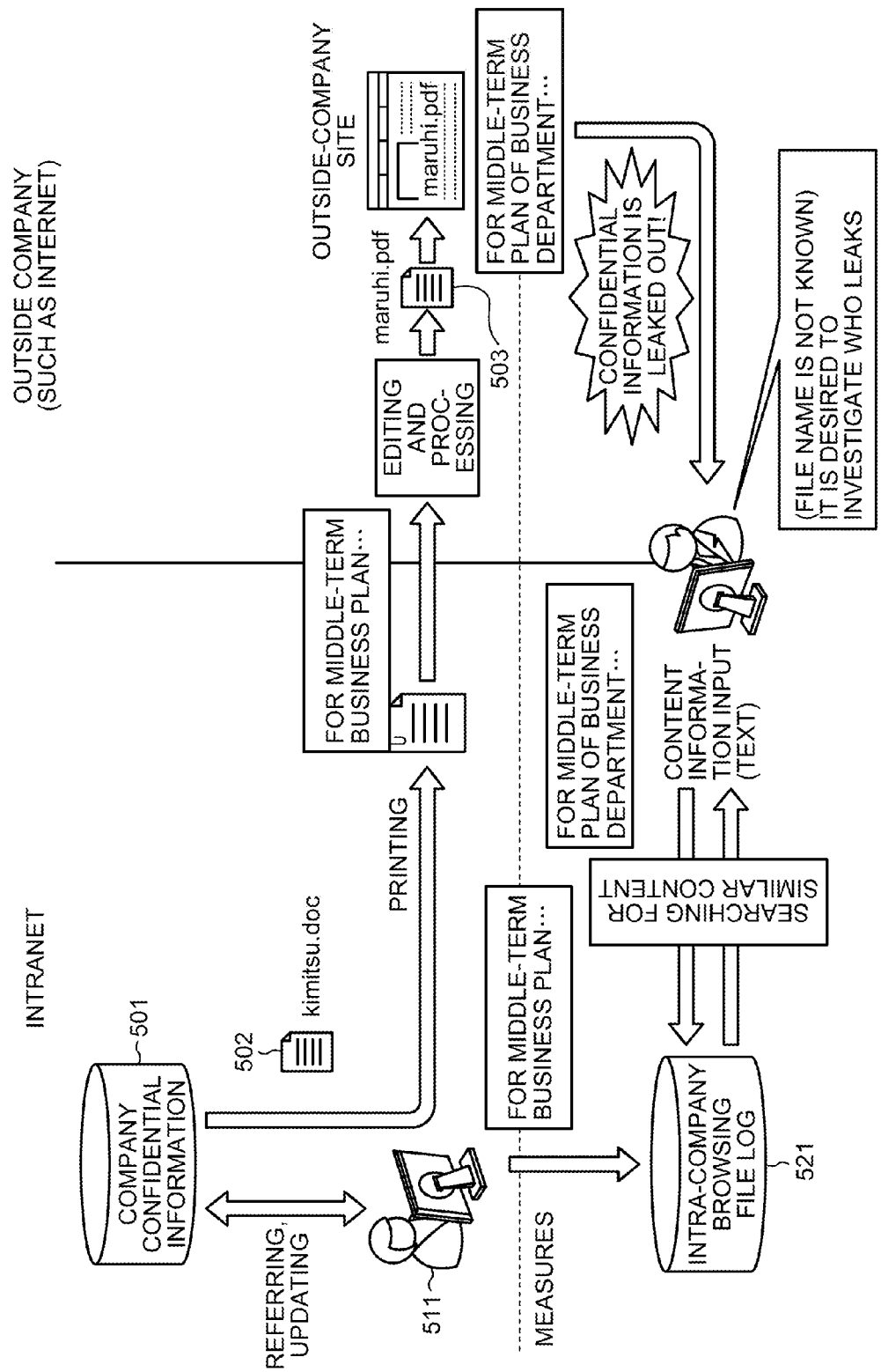
FIG. 20 is an explanation diagram illustrating investigation of information leakage.
Figure 21:
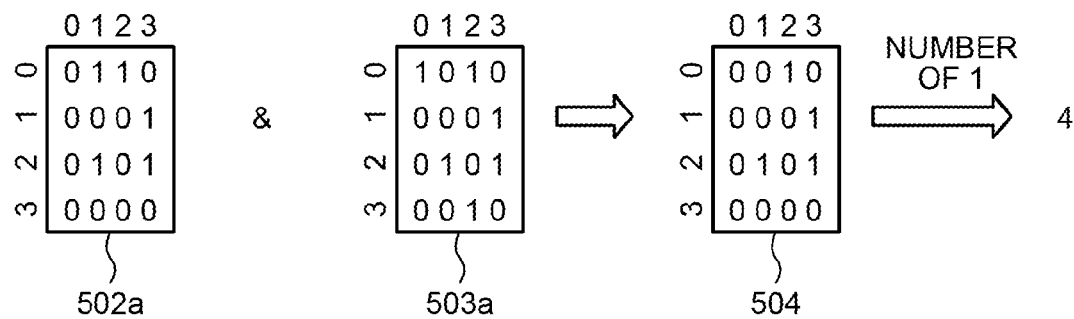
FIG. 21 is an explanation diagram illustrating comparison of feature data.

FIG. 18 is an explanation diagram illustrating a correspondence relationship of attribute. More specifically, FIG. 18 illustrates details of search results D31 where document ID is "0001" in the search result D3 of FIG. 13. In the "hit search original attribute" at the right end of the details of search results D31, the numbers of times of hit of the attributes of the search target are arranged in the order of the attribute numbers (1, 2, 3, 4). For example, with respect to the attribute number "1" of the search original, in the attribute number "1" of the search target, the feature is hit "10" times. In addition, with respect to the attribute number "2" of the search original, in the attribute number "1" of the search target, the feature is hit "1" time, and in the attribute number "2" of the search target, the feature is hit "104" times.

In S101, by comparing the "number of times of hit" and the "hit search original attribute" for each attribute number, the correspondence relationship of attribute between the search original and the search target is obtained. For example, with respect to the attribute number "1" of the search original, the number of times of hit is "10"; and with respect to the attribute number "1" of the search target, the feature is hit "10" times. Therefore, in the attribute number "1", the search original and the search target corresponds to each other. Similarly, the attribute number "2" of the search original→the attribute number "2" of the search target, the attribute number "3" of the search original→the attribute number "3" of the search target, and the attribute number "4" of the search original→the attribute number "4" of the search target are obtained.

Returning to FIG. 17, subsequently to S101, the searching unit 34 removes exceptional relationships such as overlapped attributes from the relationships obtained in S101 (S102).

Next, the searching unit 34 allows hit information to remain by using the remaining correspondence relationships obtained by removing the exceptional relationships (S103) and arranges the features and the attributes which are hit by the same records (S104). More specifically, the features which are hit between the search original and the search target are arranged again in the order of the record number and the attribute number.

Next, the searching unit 34 counts the records in the same patterns as those of the records of the searching side (search target) (S105). More specifically, the features of the search original are set to be the record 1: the attribute number 1 (38432), the attribute number 2 (Ichiro), and the attribute number 3 (40), the record 2: the attribute number 1 (76138), the attribute number 2 (Juro), and the attribute number 4 (Basketball) . . . . In addition, the features of the records of the search target are set to be the attribute number 1 (38432), the attribute number 2 (Ichiro), and the attribute number 3 (40). In this case, the record 1 of the search original is counted as the record in the same pattern. In this manner, the larger the number of counts in S105 is, the higher the degree of similarity is.

Next, the searching unit 34 applies a weighting factor to the number of times of hit in accordance with the number of counts and calculates the degree of similar relationship according to the extracted document (S106).

Returning to FIG. 9, subsequently to S66, the searching unit 34 determines whether or not the process for all the documents classified in S64 is ended (S67). In the case where the process for all the documents is not ended (S67: NO), the searching unit 34 returns to the process of S65.

In the case where the process for all the documents is ended (S67: YES), the searching unit 34 sorts the documents in the order of the degree of similar relationship (S68). Next, the output unit 35 outputs the sort result of S68 by screen display, printing, or the like (S69).

As described heretofore, the investigation apparatus 1 is configured to include the table data analyzing units 12 and 32 which analyze the uniqueness of a plurality of the values included in the attribute for each attribute of the tables. In addition, the investigation apparatus 1 is configured to include the feature output unit 13 which reduces a plurality of the values included in the attribute of which the analyzed uniqueness is lower than a predetermined value by a predetermined ratio with respect to the investigation original table of the table data D1 and outputs the feature data 21. In addition, the investigation apparatus 1 is configured to include the feature output unit 33 which reduces a plurality of the values included in the attribute of which the analyzed uniqueness is higher than a predetermined value by a predetermined ratio with respect to the investigation target table of the table data D2 and outputs the feature. In addition, the investigation apparatus 1 is configured to include the searching unit 34 which investigates the similarity of the investigation target table to the investigation original table by comparing the feature of the investigation original table with the feature of the investigation target table. Therefore, as clarified from the comparison of the condition (1) and the condition (2) in FIGS. 15 and 16, the investigation apparatus 1 can prevent the time needed for the investigation from being increased.

In addition, the investigation apparatus 1 is configured to further include the storage unit 20 which stores the feature data 21 of the investigation original table, and the searching unit 34 compares the feature data 21 stored in the storage unit 20 with the features of the investigation target table. Therefore, the investigation apparatus 1 can store the feature data 21 of the table which undergoes browsing, preserving, or the like inside the company and can use the feature data 21 for posterior investigation for specifying the table of the information leaked original.

In addition, each component of each device illustrated is not necessarily configured as illustrated physically. In other words, a specific mode of distribution and integration of each device is not limited to the illustrated one. All or some of each device may be distributed or integrated functionally or physically in arbitrary units according to various loads, use environment, or the like to be configured.

In addition, with respect to various process functions performed by the investigation apparatus 1, all or some thereof may be executed on a CPU (or a microcomputer such as an MPU or an MCU (Micro Controller Unit)). In addition, all or some of the various process functions may be allowed to be executed on a program which is analyzed and executed by a CPU (or a microcomputer such as an MPU or an MCU) or on hardware configured with wired logic.

The various processes described in the above-described embodiments may be implemented by allowing a computer to execute a program which is prepared in advance. Hereinafter, an example of the computer (hardware) executing a program having the same functions as those of the above-described embodiments will be described. FIG. 19 is a block diagram illustrating an example of a hardware configuration of an investigation apparatus 1 according to an embodiment.

As illustrated in FIG. 19, the investigation apparatus 1 is configured to include a CPU 101 which executes various calculation processes, an input device 102 which receives data input, a monitor 103, and a speaker 104. In addition, the investigation apparatus 1 is configured to include a medium reading device 105 which reads a program and the like from a storage medium, an interface device 106 for connection to various devices, and a communication device 107 for communication connection to an external device in a wired or wireless manner. In addition, the investigation apparatus 1 is configured to include a RAM 108 which temporarily stores various types of information and a hard disk device 109. In addition, the components (101 to 109) in the investigation apparatus 1 are connected to a bus 110.

The hard disk device 109 stores a program 111 for executing various processes in the recording unit 10, the storage unit 20, and the investigation unit 30 described in the above embodiments. In addition, the hard disk device 109 stores various data 112 (feature data 21 and the like) which are referred to by the program 111. The input device 102 receives, for example, an input of operation information from an operator of the investigation apparatus 1. The monitor 103 displays, for example, various screens which are operated by the operator. The interface device 106 is connected to, for example, a printing device or the like. The communication device 107 is connected to a communication network such as LAN (Local Area Network) to exchange various types of information with an external device through the communication network.

The CPU 101 reads the program 111 stored in the hard disk device 109 and expands the program on the RAM 108 to execute the program, so that various processes are performed. In addition, the program 111 is not necessarily stored in the hard disk device 109. For example, the program 111 stored in a storage medium which can be read by the investigation apparatus 1 may be allowed to be read and executed by the investigation apparatus 1. The storage medium which can be read by the investigation apparatus 1 corresponds to, for example, a portable recording medium such as a CD-ROM, a DVD disk, or a USB (Universal Serial Bus) memory, a semiconductor memory such as a flash memory, a hard disk drive, or the like. In addition, the program may be stored in a device connected to a public network, the Internet, LAN, or the like, and the investigation apparatus 1 may be allowed to read the program from the device to execute the program.

According to one embodiment, it is possible to prevent a time taken for investigation from being increased.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An investigation apparatus comprising a memory and a microprocessor coupled to the memory, the microprocessor executing a process comprising:
   inputting investigation original tables obtained from a database;
   analyzing uniqueness of a plurality of values included in an attribute for each attribute of each of the investigation original tables;
   reducing a plurality of values included in a first attribute of which the analyzed uniqueness is lower than a predetermined value by a predetermined ratio with respect to each of the investigation original tables and first outputting a feature of each of the investigation original tables to a storage unit based on values that are not reduced;
   inputting an investigation target table that includes confidential information that is leaked;
   analyzing uniqueness of a plurality of values included in an attribute for each attribute of the investigation target table;
   reducing a plurality of values included in a second attribute of which the analyzed uniqueness is higher than a predetermined value by a predetermined ratio with respect to the investigation target table and second outputting a feature of the investigation target table based on values that are not reduced;
   calculating a similarity of the investigation target table to each of the investigation original tables by comparing the feature of each of the investigation original tables stored in the storage unit with the feature of the investigation target table; and
   determining an investigation original table among the investigation original tables from which the confidential information is leaked and the investigation target table has been derived, based on the calculated similarity.

2. The investigation apparatus according to claim 1, wherein the first outputting reduces a plurality of the values included in the first attribute by a ratio corresponding to a ratio based on a number of unique values included in the first attribute and a number of records of each of the investigation original tables.

3. The investigation apparatus according to claim 1, wherein the second outputting reduces a plurality of the values included in the second attribute by a ratio corresponding to a ratio based on a number of unique values included in the second attribute and a number of records of the investigation target table.

4. The investigation apparatus according to claim 1, wherein
the each attribute is defined for each of a plurality of individuals
and the comparing includes comparing values included in the feature of each of the investigation original tables with values included in the feature of the investigation target table.

5. A non-transitory computer-readable recording medium having stored therein a program that causes a computer to execute a process comprising:
inputting investigation original tables obtained from a database;
analyzing uniqueness of a plurality of values included in an attribute for each attribute of each of the investigation original tables;
reducing a plurality of values included in a first attribute of which the analyzed uniqueness is lower than a predetermined value by a predetermined ratio with respect to each of the investigation original tables and first outputting a feature of each of the investigation original tables to a storage unit based on values that are not reduced;
inputting an investigation target table that includes confidential information that is leaked;
analyzing uniqueness of a plurality of values included in an attribute for each attribute of the investigation target table;
reducing a plurality of values included in a second attribute of which the analyzed uniqueness is higher than a predetermined value by a predetermined ratio with respect to the investigation target table and second outputting a feature of the investigation target table based on values that are not reduced;
calculating a similarity of the investigation target table to each of the investigation original tables by comparing the feature of each of the investigation original tables stored in the storage unit with the feature of the investigation target table; and
determining an investigation original table among the other investigation original tables from which the confidential information is leaked and the investigation target table has been derived, based on the calculated similarity.

6. The non-transitory computer-readable recording medium according to claim 5, wherein the first outputting reduces a plurality of the values included in the first attribute by a ratio corresponding to a ratio based on a number of unique values included in the first attribute and a number of records of each of the investigation original tables.

7. The non-transitory computer-readable recording medium according to claim 5, wherein the second outputting reduces a plurality of the values included in the second attribute by a ratio corresponding to a ratio based on a number of unique values included in the second attribute and a number of records of the investigation target table.

8. A computer-implemented method comprising:
inputting investigation original tables obtained from a database, by a processor;
analyzing uniqueness of a plurality of values included in an attribute for each attribute of each of the investigation original tables by the processor;
reducing a plurality of values included in a first attribute of which the analyzed uniqueness is lower than a predetermined value by a predetermined ratio with respect to each of the investigation original tables and first outputting a feature of each of the investigation original tables to a storage unit based on values that are not reduced, by the processor;
inputting an investigation target table that includes confidential information that is leaked, by the processor;
analyzing uniqueness of a plurality of values included in an attribute for each attribute of the investigation target table, by the processor;
reducing a plurality of values included in a second attribute of which the analyzed uniqueness is higher than a predetermined value by a predetermined ratio with respect to the investigation target table and second outputting a feature of the investigation target table based on values that are not reduced, by the processor;
calculating a similarity of the investigation target table to each of the investigation original tables by comparing the feature of each of the investigation original tables stored in the storage unit with the feature of the investigation target table, by the processor; and
determining an investigation original table among the investigation original tables from which the confidential information is leaked and the investigation target table has been derived, based on the calculated similarity, by the processor.

9. The computer-implemented method according to claim 8, wherein the first outputting reduces a plurality of the values included in the first attribute by a ratio corresponding to a ratio based on a number of unique values included in the first attribute and a number of records of each of the investigation original tables.

10. The computer-implemented method according to claim 8, wherein the second outputting reduces a plurality of the values included in the second attribute by a ratio corresponding to a ratio based on a number of unique values included in the second attribute and a number of records of the investigation target table.

* * * * *